US012667223B2

(12) United States Patent
Choi

(10) Patent No.: US 12,667,223 B2
(45) Date of Patent: Jun. 30, 2026

(54) ELECTRIC ROASTER EQUIPPED WITH DUAL AIR PURIFICATION AND CIRCULATION SYSTEM

(71) Applicant: DAWON E&A CO., LTD., Gimpo-si (KR)

(72) Inventor: Seong-Hyuk Choi, Seoul (KR)

(73) Assignee: DAWON E&A CO., LTD., Gimpo-si (KR)

( * ) Notice: Subject to any disclaimer, the term of this patent is extended or adjusted under 35 U.S.C. 154(b) by 541 days.

(21) Appl. No.: 18/273,013

(22) PCT Filed: Oct. 29, 2021

(86) PCT No.: PCT/KR2021/015392
§ 371 (c)(1),
(2) Date: Jul. 18, 2023

(87) PCT Pub. No.: WO2022/158685
PCT Pub. Date: Jul. 28, 2022

(65) Prior Publication Data
US 2024/0081581 A1 Mar. 14, 2024

(30) Foreign Application Priority Data

Jan. 21, 2021 (KR) ........................ 10-2021-0008492
Jun. 28, 2021 (KR) ........................ 10-2021-0084316

(51) Int. Cl.
*A47J 37/00* (2006.01)
*A47J 37/07* (2006.01)
(52) U.S. Cl.
CPC ....... *A47J 37/0754* (2013.01); *A47J 37/0786* (2013.01)
(58) Field of Classification Search
CPC ........................... A47J 37/0754; A47J 37/0786
See application file for complete search history.

(56) References Cited

U.S. PATENT DOCUMENTS 3,845,753 A * 11/1974 Jackson .............. A47J 37/0786
126/9 R
4,648,378 A * 3/1987 Nishikawa .......... F24C 15/2035
126/299 F
(Continued)

FOREIGN PATENT DOCUMENTS

JP 2013257119 A 12/2013
KR 200280338 Y1 7/2002
(Continued)

OTHER PUBLICATIONS

International search report of PCT/R2021/015392, Jan. 7, 2022, English translation.

*Primary Examiner* — Nicholas Krasnow
(74) *Attorney, Agent, or Firm* — STIP Law Group, LLC

(57) ABSTRACT

The present disclosure relates to an electric roaster equipped with a dual air purification and circulation system, wherein a suction fan consists of a first suction fan and a second suction fan disposed at both sides of a lower space of a roaster main body with an oil receiver, which is disposed under oil discharge nozzles of a roasting plate, disposed therebetween, the first suction fan forms a first air circulation flow by sucking air containing oil vapor, smoke, heat and odor generated at the top of the roasting plate through the oil discharge nozzles and supplying the air back to the top of the roasting plate through first discharge holes of a heat protection plate, the second suction fan forms a second air circulation flow by sucking air containing oil vapor, smoke, heat and odor generated at the top of the roasting plate through the oil discharge nozzles and supplying the air back to the top of the roasting plate through second discharge holes of the heat protection plate, and the air containing oil vapor, smoke, heat and odor discharged from the oil discharge nozzles by the suction force of the first suction fan and the second suction fan is purified by contact with water stored (Continued)

in the oil receiver disposed under the oil discharge nozzles and then introduced into the first suction fan and the second suction fan.

9 Claims, 5 Drawing Sheets

(56)                    References Cited

U.S. PATENT DOCUMENTS

| | | | | |
|---|---|---|---|---|
| 5,941,584 | A * | 8/1999 | Young | A47J 37/0786 |
| | | | | 294/58 |
| 6,123,014 | A * | 9/2000 | Jo | A47J 37/041 |
| | | | | 219/400 |
| 7,219,936 | B1 * | 5/2007 | Willford | A47J 37/04 |
| | | | | 99/421 A |
| 9,179,803 | B1 * | 11/2015 | Benelli | A47J 43/18 |
| 11,937,737 | B1 * | 3/2024 | Kim | A47J 37/0754 |

| | | | | |
|---|---|---|---|---|
| 2002/0112716 | A1 * | 8/2002 | Liu | A47J 37/0786 |
| | | | | 126/25 R |
| 2008/0303478 | A1 * | 12/2008 | Lee | H02J 7/855 |
| | | | | 320/101 |
| 2010/0282094 | A1 * | 11/2010 | Oh | A47J 37/044 |
| | | | | 99/386 |
| 2011/0097468 | A1 * | 4/2011 | Driscoll | A47J 37/0704 |
| | | | | 99/450 |
| 2013/0192474 | A1 * | 8/2013 | Rodriguez Aceves | |
| | | | | A47J 37/043 |
| | | | | 99/443 R |
| 2013/0341317 | A1 * | 12/2013 | Zoucha | A21B 1/22 |
| | | | | 219/411 |
| 2020/0229644 | A1 * | 7/2020 | Mao | A47J 37/0713 |
| 2024/0341527 | A1 * | 10/2024 | Khang | A47J 37/0641 |

FOREIGN PATENT DOCUMENTS

| | | |
|---|---|---|
| KR | 101803836 B1 | 12/2017 |
| KR | 102109966 B1 | 5/2020 |
| KR | 102273131 B1 | 7/2021 |

* cited by examiner

ELECTRIC ROASTER EQUIPPED WITH DUAL AIR PURIFICATION AND CIRCULATION SYSTEM

CROSS-REFERENCE TO RELATED APPLICATIONS

This application is the U.S. National Phase under 35 U.S.C. § 371 of International Application No. PCT/KR2021/015392, filed on Oct. 29, 2021, which in turn claims the benefit of Korean Application Nos. 10-2021-0008492, filed on Jan. 21, 2021, and 10-2021-0084316, filed on Jun. 28, 2021, the entire disclosures of which are incorporated by reference into the present application.

TECHNICAL FIELD

The present disclosure relates to an electric roaster, and more particularly, to an electric roaster equipped with an air purification and circulation system capable of removing oil vapor and smoke generated while cooking food.

BACKGROUND ART

Generally, households, restaurants, or the like are equipped with an electric roaster which includes a grill having a plurality of oil discharge holes formed therein and an oil receiver provided under the grill to receive oil falling from the oil discharge holes.

In the electric roaster, oil generated while roasting meat is discharged to the oil receiver under the grill through the oil discharge holes of the grill. However, a relatively large amount of oil splatters to the outside and contaminates the surroundings of the electric roaster, odor or smoke generated while roasting meat spreads indoors and causes indoor air to be contaminated, and due to heat of the grill being released indoors while roasting meat, the meat roasting time is prolonged, and power consumption is increased as a result.

In order to address such problems, referring to FIG. 1, the inventor of the present disclosure has developed and has filed an application and been granted a patent for an electric roaster equipped with an oil vapor and smoke purification and circulation system, the electric roaster including: a roaster main body 100; an oil receiver 110 installed at one side inside a lower portion of the roaster main body 100 and configured to store water; a suction fan 120 provided at one side of the oil receiver 110 and configured to suck air containing oil vapor, smoke, heat and odor and blow the air to an area above the water stored in the oil receiver 110; a heat protection plate 150 coupled to be disposed above and spaced apart from the oil receiver 110 and the suction fan 120 and having through-holes 157 formed at regular intervals in a central portion in a longitudinal direction thereof and a plurality of suction holes 154 and discharge holes 153 formed at both side ends of an upper peripheral portion in a longitudinal direction thereof; and a roasting plate 170 installed to be disposed above and spaced apart from the heat protection plate 150 and having a plurality of oil discharge nozzles 171 formed at regular intervals in a central portion in a longitudinal direction thereof, wherein an air guide 130 configured to guide the sucked air containing oil vapor, smoke, heat and odor toward the water stored in the oil receiver 110 is installed between the oil receiver 110 and the suction fan 120 to allow the air containing oil vapor, smoke, heat and odor, which is blown by the suction fan 120, to, by the air guide 130, flow downward toward the water stored in the oil receiver 110 to increase contact between the air and the water and thus improve purification performance (refer to 'Patent Document 1' below).

However, in the conventional electric roaster disclosed in "Patent Document 1', as in an air flow indicated by black arrows in FIG. 1, a phenomenon occurs in which some of the air containing oil vapor, smoke, heat and odor generated while roasting meat on the roasting plate 170 spreads to the outside over the roaster main body 100 due to inertia instead of being sucked into the suction holes 154 of the heat protection plate 150, and thus there still remains a problem that the surroundings of the electric roaster are contaminated.

Further, in the conventional electric roaster, since the suction fan 120 sucks and blows air before the air is purified of oil vapor, smoke, heat and odor, the conventional electric roaster inevitably has a structure in which the inside of the suction fan 120 is directly exposed to contamination caused by the oil vapor or the like and thus has a problem that the durability of the suction fan 120 is significantly reduced.

Also, in the conventional electric roaster, since the air containing oil vapor is condensed and generates oil while flowing over an inner sidewall portion of the roaster main body 100 and contaminates the inner sidewall portion of the roaster main body 100 even before being introduced into the suction fan 120 after being sucked into the suction holes 154, in order to prevent such contamination, there is a need to additionally provide an oil fence 140 at the inner sidewall portion of the roaster main body 100.

Also, since the oil receiver 110 storing the water for purifying the air containing oil vapor, smoke, heat and odor is disposed downstream of the suction fan 120 in an air circulation flow indicated by white arrows in FIG. 1, in order to improve the purification performance, the air guide 130 configured to guide the air blown by the suction fan 120 toward the water stored in the oil receiver 110 should be provided.

However, there is a problem that the air guide 130, the oil fence 140, and the like eventually lead to an increase in the number of components and adversely affect the manufacturing process and manufacturing costs of the electric roaster.

(Patent Document 1) KR 10-1803836 B1 (Dec. 4, 2017)

DISCLOSURE

Technical Problem

The present disclosure is directed to providing an electric roaster equipped with a dual air purification and circulation system capable of fundamentally preventing a phenomenon in which air containing oil vapor, smoke, heat and odor generated while roasting meat spreads to an outside of a roaster main body.

Technical Solution

The present disclosure provides an electric roaster equipped with a dual air purification and circulation system, the electric roaster including: a roaster main body; an oil receiver installed at an inner side of a lower portion of the roaster main body and configured to store water; a suction fan provided to be disposed at both sides of the oil receiver; a heat protection plate coupled to be disposed above and spaced apart from the oil receiver and the suction fan and having through-holes formed at regular intervals in a central portion of a bottom plate in a longitudinal direction thereof and a plurality of first discharge holes and second discharge holes formed at both side plates disposed to be spaced apart from both inner sidewall portions of the roaster main body; and a roasting plate installed to be disposed above and spaced apart from the bottom plate of the heat protection plate so that the first discharge holes and the second discharge holes of the heat protection plate are disposed thereabove and having a plurality of oil discharge nozzles formed at regular intervals in a central portion in a longitudinal direction thereof, wherein the suction fan consists of a first suction fan and a second suction fan disposed at both sides of a lower space of the roaster main body with the oil receiver, which is disposed under the oil discharge nozzles, disposed therebetween, the first suction fan forms a first air circulation flow by sucking air containing oil vapor, smoke, heat and odor generated at the top portion of the roasting plate through the oil discharge nozzles and supplying the air back to the top of the roasting plate through the first discharge holes of the heat protection plate, the second suction fan forms a second air circulation flow by sucking air containing oil vapor, smoke, heat and odor generated at the top of the roasting plate through the oil discharge nozzles and supplying the air back to the top of the roasting plate through the second discharge holes of the heat protection plate, and the air containing oil vapor, smoke, heat and odor discharged from the oil discharge nozzles by the suction force of the first suction fan and the second suction fan is purified by contact with the water stored in the oil receiver disposed under the oil discharge nozzles, and then introduced into the first suction fan and the second suction fan.

Preferably, the oil discharge nozzles of the roasting plate may be coupled to pass through the through-holes of the heat protection plate.

Preferably, the suction fan may be a long type fan.

Preferably, a lateral cross-section of the roasting plate may have a "V" shape.

Preferably, the oil receiver may be installed to be assembled to and disassembled from the roaster main body by a sliding coupling manner at one side of the lower portion of the roaster main body.

Meanwhile, the electric roaster equipped with the dual air purification and circulation system according to the present disclosure may further include a guide means for directing the air containing oil vapor, smoke, heat and odor discharged from the oil discharge nozzles to the oil receiver.

The guide means may be installed inside the roaster main body to be disposed between the oil receiver and the heat protection plate.

The guide means may have: a first air hole provided at a position facing the oil discharge nozzles in a central portion in a longitudinal direction thereof; a second air hole provided at positions each facing the first and second suction fans; and a guide surface having a curved shape to head toward the oil receiver from the first air hole and then head toward the second air hole again and configured to cover an upper portion of the oil receiver.

Preferably, an opening through which the oil receiver is able to pass may be formed in a lower end of one side of the guide means.

Advantageous Effects

In an electric roaster equipped with a dual air purification and circulation system according to the present disclosure, due to a first suction fan and a second suction fan, first discharge holes and second discharge holes formed in a heat protection plate only discharge purified air, and suction of air containing oil vapor, smoke, heat and odor is only performed through oil discharge nozzles of a roasting plate through which oil generated during cooking is discharged. In this way, contamination of the surroundings of the electric roaster can be prevented.

Also, air purified of oil vapor, smoke, heat, and odor is allowed to flow inside the first suction fan and the second suction fan, and thus the inside of the suction fans can be prevented from being exposed to contamination by oil vapor or the like.

Also, a first air circulation flow and a second air circulation flow formed by the first suction fan and the second suction fan allow an additional configuration such as an oil fence or an air guide in the related art to be omitted, which is beneficial in terms of the manufacturing process and manufacturing costs.

In addition, by a guide means, an air flow heading directly toward the first and second suction fans without coming in contact with water stored in an oil receiver is minimized, thereby maximizing the purification efficiency.

Figure 1:
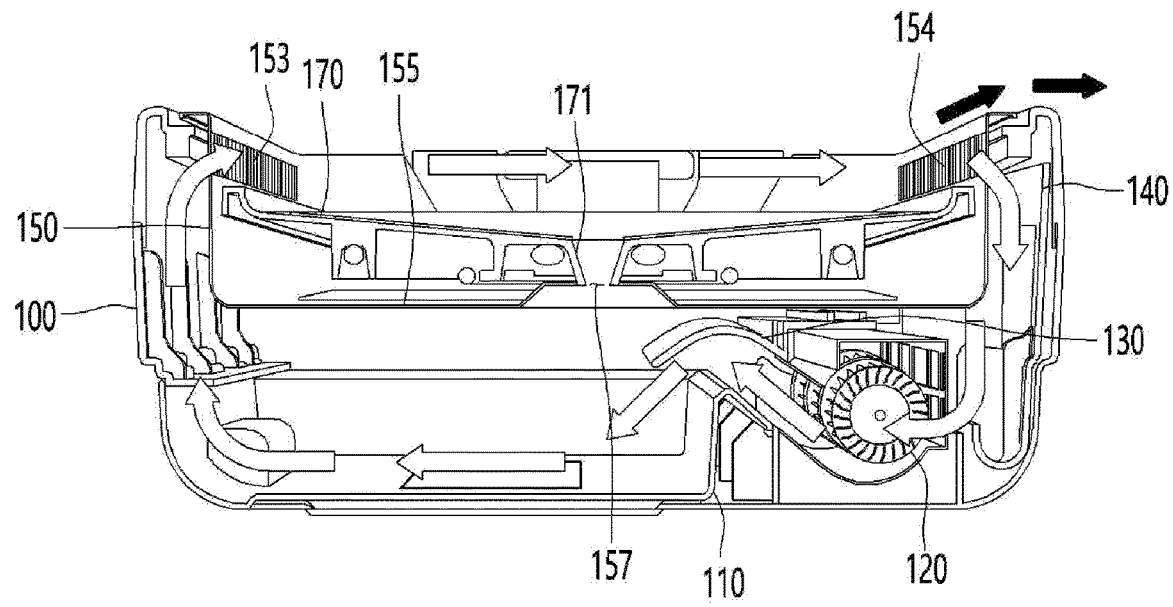
FIG. 1 is a cross-sectional view illustrating an air circulation flow of an electric roaster according to the related art.

| *Description of major reference numerals in the drawings* | |
|---|---|
| 100: roaster main body | 110: oil receiver |
| 121: first suction fan | 122: second suction fan |
| 150: heat protection plate | 151, 152: side plate |
| 153: first discharge hole | 154: second discharge hole |
| 155: bottom plate | 157: through-hole |
| 160: heating body | 161: heater |
| 162: temperature control knob | 163: suction fan switch |
| 170: roasting plate | 171: oil discharge nozzle |
| 180: guide means | 181: first air hole |
| 182: second air hole | 183: guide surface |
| 184: opening | |

MODES OF THE INVENTION

Hereinafter, an electric roaster equipped with a dual air purification and circulation system according to the present disclosure will be described in detail with reference to the accompanying drawings. However, detailed description of known functions and configurations that may unnecessarily obscure the gist of the present disclosure will be omitted.

Figure 2:
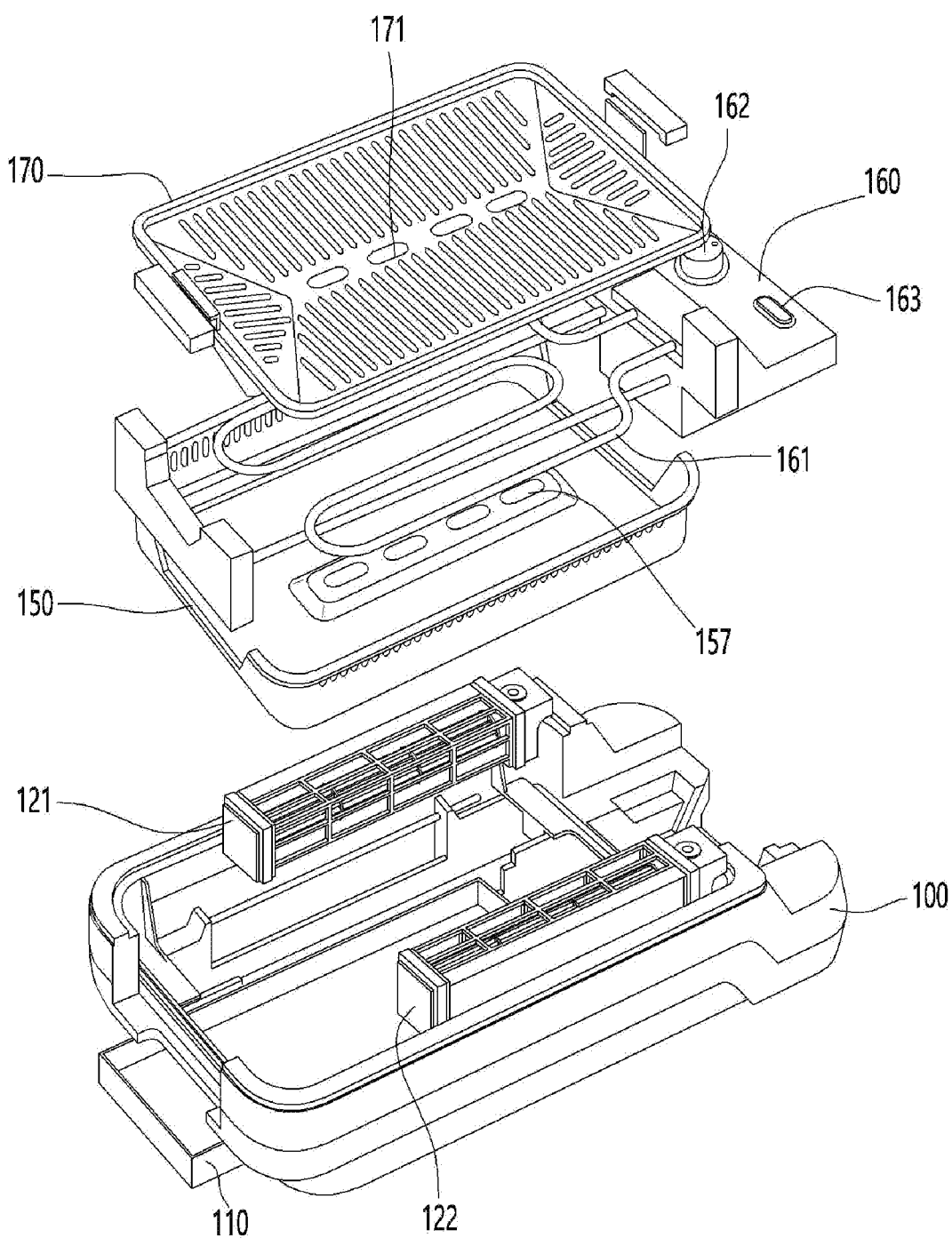
FIG. 2 is an exploded perspective view of an electric roaster equipped with a dual air purification and circulation system according to the present disclosure.
Figure 3:
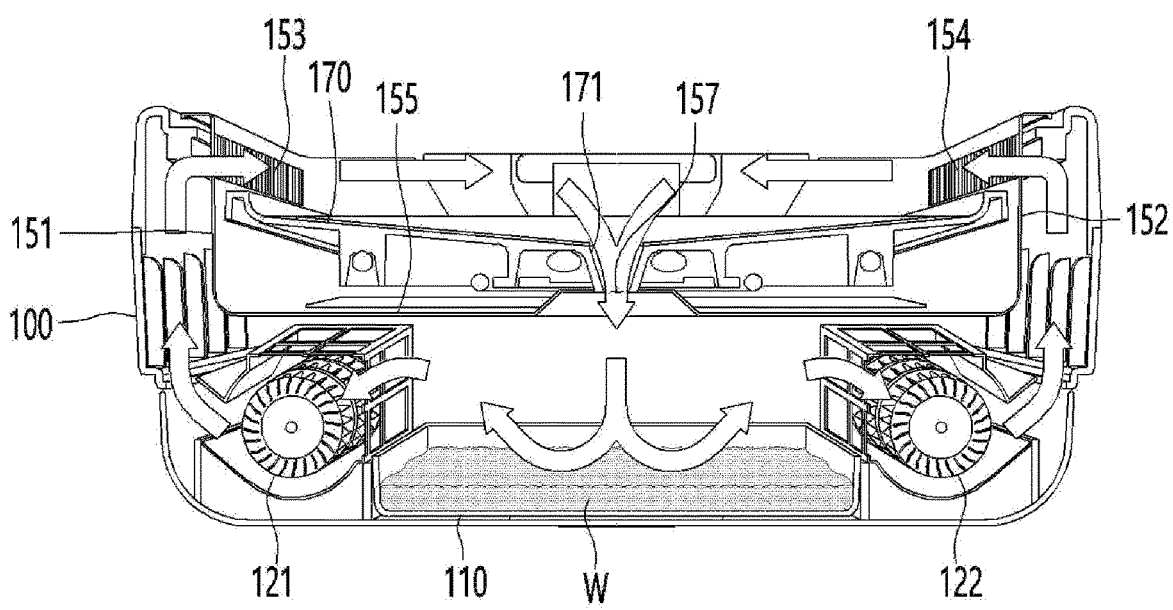
FIG. 3 is a cross-sectional view illustrating an air circulation flow of the electric roaster equipped with the dual air purification and circulation system according to the present disclosure.

FIG. 2 is an exploded perspective view of an electric roaster equipped with a dual air purification and circulation system according to the present disclosure, and FIG. 3 is a cross-sectional view illustrating an air circulation flow of the electric roaster equipped with the dual air purification and circulation system according to the present disclosure.

Referring to FIG. 2, the electric roaster equipped with the dual air purification and circulation system according to the present disclosure includes a roaster main body 100, an oil receiver 110 installed at an inner side of a lower portion of the roaster main body 100 and configured to store water, suction fans 121 and 122 disposed at both sides of the oil receiver 110, a heat protection plate 150 coupled to be disposed above and spaced apart from the oil receiver 110 and the suction fans 121 and 122, a roasting plate 170 installed to be disposed above and spaced apart from the heat protection plate 150, and a heating body 160 disposed under the roasting plate 170 and having components such as a heater 161, a temperature control knob 162, and a suction fan switch 163 installed therein.

A lateral cross-section of the roasting plate 170 has a "V" shape, and a plurality of oil discharge nozzles 171 are formed at regular intervals in a central portion of the roasting plate 170 in a longitudinal direction thereof.

In the present disclosure, the oil discharge nozzles 171 not only allow oil generated during cooking to gather at the central portion of the roasting plate 170 and be discharged to the oil receiver 110 disposed under the oil discharge nozzles 171, but also, as described below, allow air containing oil vapor, smoke, heat and odor generated at the top of the roasting plate 170 to be discharged to the oil receiver 110 disposed under the oil discharge nozzles 171.

The heat protection plate 150 has through-holes 157 formed at regular intervals in a central portion of a bottom plate 155 in a longitudinal direction thereof, and the oil discharge nozzles 171 of the roasting plate 170 are coupled to pass through the through-holes 157. Accordingly, an upper space where the heater 161 of the heating body 160 is disposed and a lower space where the suction fans 121 and 122 are disposed are separated from each other, and thus the suction fans 121 and 122 are prevented from being heated and damaged due to heat generated from the heater 161 of the heating body 160.

Also, a plurality of first discharge holes 153 and second discharge holes 154 are formed at both side plates 151 and 152 of an upper peripheral portion of the heat protection plate 150 in a longitudinal direction thereof and allow air blown by the suction fans 121 and 122 to be supplied to the top of the roasting plate 170 and form an air curtain (refer to arrows in FIG. 3).

The type of the suction fans 121 and 122 is not particularly limited, but a long type fan illustrated in FIG. 2 is more suitable to form a uniform air curtain at the top of the roasting plate 170.

As illustrated in FIG. 2, the oil receiver 110 may be installed to be assembled to and disassembled from the roaster main body 100 by a sliding coupling manner at one side of the lower portion of the roaster main body 100.

Referring to FIG. 3, in the present disclosure, the suction fans 121 and 122 consist of a first suction fan 121 and a second suction fan 122 disposed at both sides of a lower space of the roaster main body 100 with the oil receiver 110, which is disposed under the oil discharge nozzles 171, disposed therebetween.

Accordingly, the first suction fan 121 forms a first air circulation flow by sucking air containing oil vapor, smoke, heat and odor generated at the top of the roasting plate 170 through the oil discharge nozzles 171 and supplying the air back to the top of the roasting plate 170 through the first discharge holes 153 of the heat protection plate 150, and simultaneously, the second suction fan 122 forms a second air circulation flow by sucking air containing oil vapor, smoke, heat and odor generated at the top of the roasting plate 170 through the oil discharge nozzles 171 and supplying the air back to the top of the roasting plate 170 through the second discharge holes 154 of the heat protection plate 150.

Here, the air containing oil vapor, smoke, heat and odor discharged from the oil discharge nozzles 171 by the suction force of the first suction fan 121 and the second suction fan 122 heads to the oil receiver 110 disposed under the oil discharge nozzles 171, is purified by contact with water W stored in the oil receiver 110, and then is introduced into the first suction fan 121 and the second suction fan 122.

Therefore, unlike in the related art, air purified of oil vapor, smoke, heat and odor flows inside the first suction fan 121 and the second suction fan 122, and thus the inside of the suction fans 121 and 122 is not exposed to contamination by oil vapor or the like, and the durability of the suction fans 121 and 122 is improved.

Also, since the first discharge holes 153 and the second discharge holes 154 formed in the heat protection plate 150 only discharge purified air, and suction of air containing oil vapor, smoke, heat and odor is only performed through the oil discharge nozzles 171 of the roasting plate 170 through which oil generated during cooking is discharged, the possibility that unpurified air may spread to the outside over the roaster main body 100 along an air circulation flow path is fundamentally eliminated, and thus contamination of the surroundings of the electric roaster can be prevented.

Also, since air blown from the first suction fan 121 and the second suction fan 122 is air purified of oil vapor or the like, there is no concern about contaminating an inner sidewall portion of the roaster main body 100 along the air circulation flow path, and accordingly, there is an advantage that a configuration of an oil fence in the related art can be omitted.

Also, since air is guided to flow to the oil receiver 110 by the oil discharge nozzles 171 themselves when air containing oil vapor, smoke, heat and odor is sucked into the roaster main body 100 through the oil discharge nozzles 171, an additional configuration such as an air guide in the related art can also be omitted.

Figure 4:
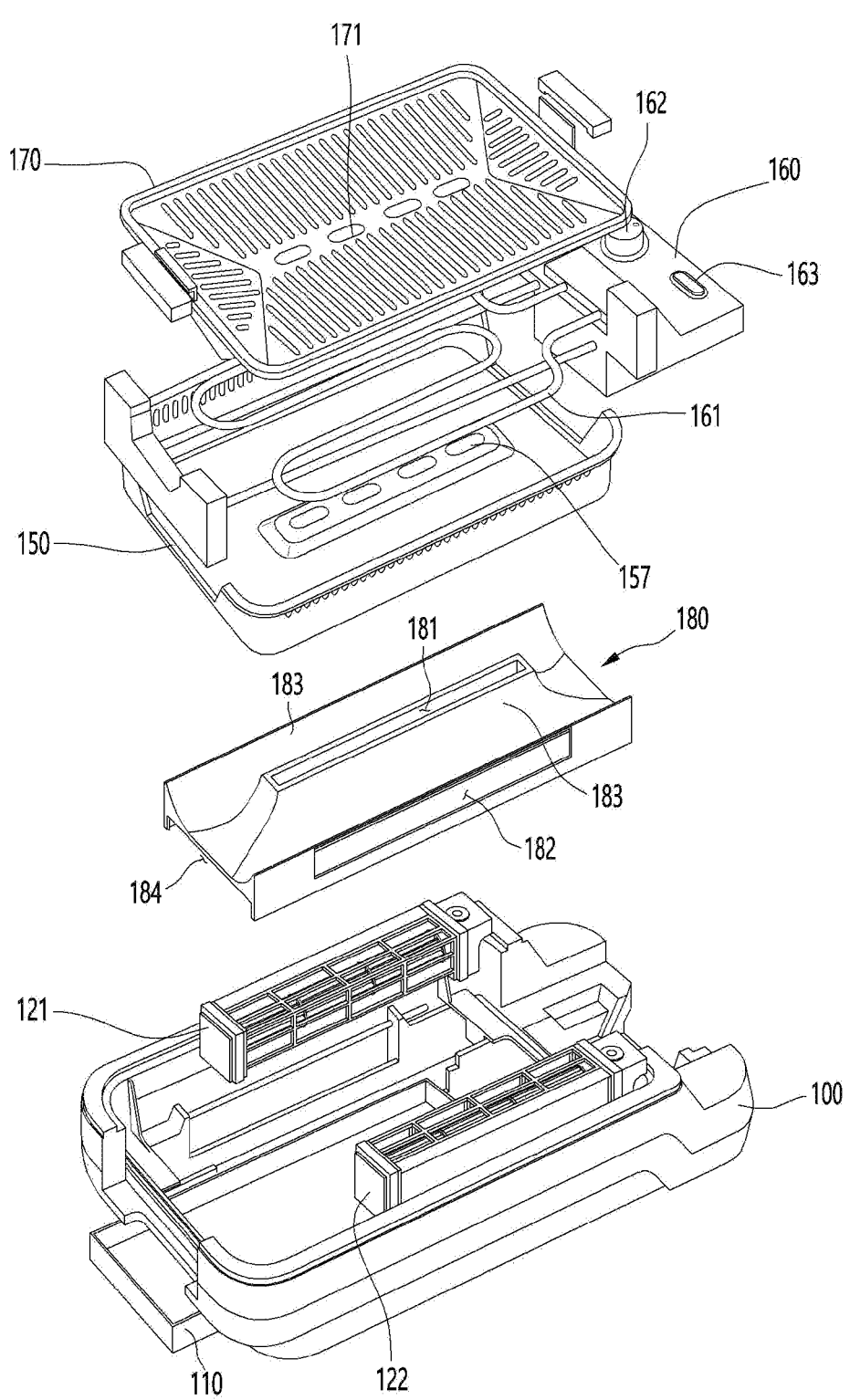
FIG. 4 is an exploded perspective view of an electric roaster equipped with a dual air purification and circulation system according to a second embodiment of the present disclosure that includes a guide means.
Figure 5:
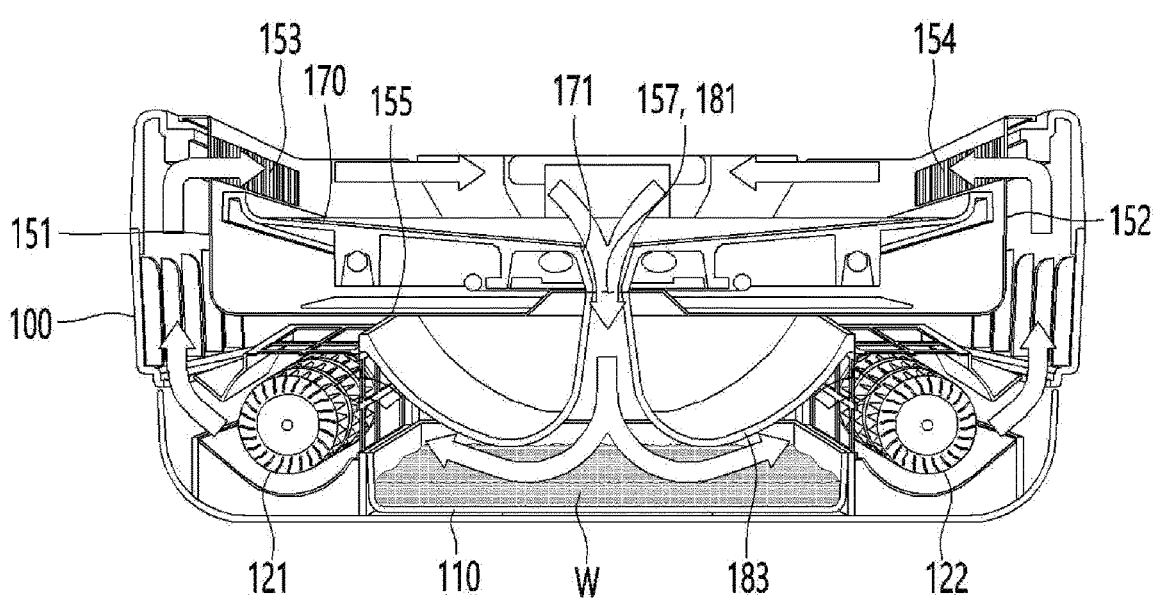
FIG. 5 is a cross-sectional view illustrating an air circulation flow of the electric roaster equipped with the dual air purification and circulation system according to the second embodiment of the present disclosure that includes the guide means.

Meanwhile, referring to FIGS. 4 and 5, in a second embodiment of the present disclosure, the electric roaster equipped with the dual air purification and circulation system according to the present disclosure further includes a guide means 180 for directing air containing oil vapor, smoke, heat and odor discharged from the oil discharge nozzles 171 to the oil receiver 110.

The guide means 180 is installed inside the roaster main body 100 to be disposed between the oil receiver 110 and the heat protection plate 150 and is formed to have a first air hole 181 provided at a position facing the oil discharge nozzles 171 at the central portion thereof in the longitudinal direction, a second air hole 182 provided at positions each facing the first and second suction fans 121 and 122, and a guide surface 183 having a curved shape to head toward the oil receiver 110 from the first air hole 181 and then head toward the second air hole 182 again and configured to cover an upper portion of the oil receiver 110.

Accordingly, the air containing oil vapor, smoke, heat and odor discharged from the oil discharge nozzles 171 is introduced into the guide means 180 through the first air hole 181, comes in contact with the water W stored in the oil receiver 110 due to an air flow formed by the guide surface 183, and then is sucked into the first and second suction fans 121 and 122 through the second air hole 182.

The guide surface 183 serves to suppress a flow of the air containing oil vapor, smoke, heat and odor discharged from the oil discharge nozzles 171 from heading directly to the first and second suction fans 121 and 122 without coming in contact with the water W stored in the oil receiver 110.

Therefore, in the second embodiment of the present disclosure, since the guide means 180 ensures that the air containing oil vapor, smoke, heat and odor discharged from the oil discharge nozzles 171 is directed to the oil receiver 110, it is possible to minimize a flow of the air containing oil vapor, smoke, heat, and odor discharged from the oil discharge nozzles 171 heading directly toward the first and second suction fans 121 and 122 without coming in contact with the water W stored in the oil receiver 110, and thus the purification efficiency can be maximized.

An opening 184 through which the oil receiver 110 is able to pass is formed in a lower end of one side of the guide means 180 and allows the oil receiver 110 to be assembled to and disassembled from the roaster main body 100 by a sliding coupling manner at the one side of the lower portion of the roaster main body 100.

Embodiments disclosed in the present specification and the accompanying drawings are only used for the purpose of easily describing the technical spirit of the present disclosure and are not used to limit the scope of the present disclosure stated in the appended claims. Therefore, those of ordinary skill in the art should understand that various modifications and other equivalent embodiments are possible from the embodiments described herein.

The invention claimed is:

1. An electric roaster equipped with a dual air purification and circulation system, the electric roaster comprising:

a roaster main body;

an oil receiver installed at an inner side of a lower portion of the roaster main body and configured to store water;

a suction fan provided to be disposed at both sides of the oil receiver;

a heat protection plate coupled to be disposed above and spaced apart from the oil receiver and the suction fan and having through-holes formed at regular intervals in a central portion of a bottom plate in a longitudinal direction thereof and a plurality of first discharge holes and second discharge holes formed at both side plates disposed to be spaced apart from both inner sidewall portions of the roaster main body; and a roasting plate installed to be disposed above and spaced apart from the bottom plate of the heat protection plate so that the first discharge holes and the second discharge holes of the heat protection plate are disposed thereabove and having a plurality of oil discharge nozzles formed at regular intervals in a central portion in a longitudinal direction thereof, wherein the suction fan consists of a first suction fan and a second suction fan disposed at both sides of a lower space of the roaster main body with the oil receiver, which is disposed under the oil discharge nozzles, disposed therebetween, the first suction fan forms a first air circulation flow by sucking air containing oil vapor, smoke, heat and odor generated at the top of the roasting plate through the oil discharge nozzles and suppling the air back to the top of the roasting plate through the first discharge holes of the heat protection plate, the second suction fan forms a second air circulation flow by sucking air containing oil vapor, smoke, heat and odor generated at the top of the roasting plate through the oil discharge nozzles and suppling the air back to the top of the roasting plate through the second discharge holes of the heat protection plate, and the air containing oil vapor, smoke, heat and odor discharged from the oil discharge nozzles by the suction force of the first suction fan and the second suction fan is purified by contact with the water stored in the oil receiver disposed under the oil discharge nozzles and then introduced into the first suction fan and the second suction fan.

2. The electric roaster of claim 1, wherein the oil discharge nozzles of the roasting plate are coupled to pass through the through-holes of the heat protection plate.

3. The electric roaster of claim 1, wherein the suction fan is a long type fan.

4. The electric roaster of claim 1, wherein a lateral cross-section of the roasting plate has a "V" shape.

5. The electric roaster of claim 1, wherein the oil receiver is installed to be assembled to and disassembled from the roaster main body by a sliding coupling manner at one side of the lower portion of the roaster main body.

6. The electric roaster of claim 1, further comprising a guide means for directing the air containing oil vapor, smoke, heat and odor discharged from the oil discharge nozzles to the oil receiver.

7. The electric roaster of claim 6, wherein the guide means is installed inside the roaster main body to be disposed between the oil receiver and the heat protection plate.

8. The electric roaster of claim 7, wherein the guide means has:

a first air hole provided at a position facing the oil discharge nozzles in a central portion in a longitudinal direction thereof;

a second air hole provided at positions each facing the first and second suction fans; and a guide surface having a curved shape to head toward the oil receiver from the first air hole and then head toward the second air hole again and configured to cover an upper portion of the oil receiver.

9. The electric roaster of claim 8, wherein:

the oil receiver is installed to be assembled to and disassembled from the roaster main body by a sliding coupling manner at one side of a lower portion of the roaster main body; and an opening through which the oil receiver is able to pass is formed in a lower end of one side of the guide means.

* * * * *